(12) United States Patent
Wöhner et al.

(10) Patent No.: US 10,328,767 B2
(45) Date of Patent: Jun. 25, 2019

(54) DEVICE FOR FILLING AIR-CONDITIONING SYSTEMS WITH A COOLANT IN THE FINAL ASSEMBLY OF THE VEHICLE

(71) Applicant: DÜRR SOMAC GmbH, Stollberg (DE)

(72) Inventors: Carsten Wöhner, Stuttgart (DE); Frank Wieland, Burkhardtsdorf (DE); Daniel Wappler, Zwickau (DE)

(73) Assignee: DÜRR SOMAC GmbH, Stollberg (DE)

( * ) Notice: Subject to any disclaimer, the term of this patent is extended or adjusted under 35 U.S.C. 154(b) by 214 days.

(21) Appl. No.: 15/329,472

(22) PCT Filed: Jul. 30, 2015

(86) PCT No.: PCT/DE2015/000393
§ 371 (c)(1),
(2) Date: Jan. 26, 2017

(87) PCT Pub. No.: WO2016/015706
PCT Pub. Date: Feb. 4, 2016

(65) Prior Publication Data
US 2017/0210199 A1    Jul. 27, 2017

(30) Foreign Application Priority Data

Aug. 1, 2014  (DE) .......................... 10 2014 011 611

(51) Int. Cl.
*B60H 1/00* (2006.01)
*F16L 37/44* (2006.01)
(Continued)

(52) U.S. Cl.
CPC .......... *B60H 1/00585* (2013.01); *F16L 37/23* (2013.01); *F16L 37/44* (2013.01);
(Continued)

(58) Field of Classification Search
CPC ...... B60H 1/00585; F16L 37/23; F16L 37/32; F16L 37/44; Y10T 137/87917–87973;
(Continued)

(56) References Cited

U.S. PATENT DOCUMENTS 4,869,300 A * 9/1989 Gudenau ................. F16K 11/18
                                                                141/59
5,139,049 A   8/1992 Jensen et al.
(Continued)

FOREIGN PATENT DOCUMENTS

GB          2250073 A       5/1992
WO    WO-2007/106486 A1    9/2007

OTHER PUBLICATIONS

International Search Report and Written Opinion of the ISA for PCT/DE2015/000393, ISA/EP, Rijswijk, NL, dated Dec. 18, 2015.

*Primary Examiner* — Craig J Price
(74) *Attorney, Agent, or Firm* — Harness, Dickey & Pierce, P.L.C.

(57) ABSTRACT

A device for filling air conditioning systems with a refrigerant during final vehicle assembly, wherein the air conditioning system comprises a connection valve on its low and high pressure sides, via which the air conditioning system can be pressure tested, evacuated, and filled, which facilitates maintenance operations in the life cycle of the system, wherein said connection valves have different geometrical contours between the high and low pressure side and to ensure that only the respective approved refrigerant is filled into the air conditioning system, and wherein the filling is performed using a filling system brought via adapters into an operative connection with the connection valves on the low and high pressure sides. The device is designed to allow filling with two different refrigerants using just two adapters (Continued)

and still ensures that a proper refrigerant is filled into the respective air conditioning system.

5 Claims, 9 Drawing Sheets

(51) Int. Cl.
  *F25B 45/00* (2006.01)
  *F16L 37/23* (2006.01)
(52) U.S. Cl.
  CPC ......... *F25B 45/00* (2013.01); *Y10T 137/8225* (2015.04); *Y10T 137/87925* (2015.04)
(58) Field of Classification Search
  CPC ......... Y10T 137/9029; Y10T 137/8158; Y10T 137/8225–8309; F25B 45/00; F25B 2345/001; F25B 2345/002; F25B 2345/006; F16K 37/00–37/0091
  USPC ................ 137/613–614.06, 551, 553–556.6; 251/149.9; 141/59, 65, 66, 302, 383, 141/385; 62/77, 292, 298, 299
  See application file for complete search history.

(56) References Cited

U.S. PATENT DOCUMENTS

| | | | | |
|---|---|---|---|---|
| 5,244,010 | A | * | 9/1993 | Barjasteh ........... B60H 1/00585 137/614 |
| RE34,426 | E | * | 11/1993 | Weaver .................. F16L 37/12 137/614 |
| 5,349,998 | A | * | 9/1994 | Gonfiantini ............. F25B 45/00 137/522 |
| 6,257,285 | B1 | * | 7/2001 | Robinson ............. F01P 11/0204 141/21 |
| 6,298,886 | B1 | * | 10/2001 | Robinson ........... B60H 1/00585 137/614.06 |
| 6,450,199 | B1 | | 9/2002 | Haunhorst |
| 6,848,670 | B2 | | 2/2005 | Haunhorst et al. |
| 7,404,414 | B2 | * | 7/2008 | Robinson ........... B60H 1/00585 137/614 |
| 7,588,059 | B2 | * | 9/2009 | Robinson ................ F16L 37/23 141/302 |
| 7,841,357 | B2 | | 11/2010 | Rankin |
| 2003/0226598 | A1 | * | 12/2003 | Swinford ........... B60H 1/00585 137/614 |
| 2007/0209716 | A1 | | 9/2007 | Rankin |
| 2007/0256742 | A1 | | 11/2007 | Robinson et al. |

\* cited by examiner

DEVICE FOR FILLING AIR-CONDITIONING SYSTEMS WITH A COOLANT IN THE FINAL ASSEMBLY OF THE VEHICLE

CROSS-REFERENCE TO RELATED APPLICATIONS

This application is a 371 U.S. National Stage of International Application No. PCT/DE2015/000393, filed Jul. 30, 2015, which claims the benefit of and priority to German Patent Application No. 10 2014 011 611.5, filed Aug. 1, 2014. The disclosures of the above applications are incorporated herein by reference.

FIELD

The invention relates to a device for filling air conditioning systems with a refrigerant during final vehicle assembly.

BACKGROUND

The mobile air conditioning systems in vehicles, typically referred to by the English term "Mobile Air Conditioning System/MAC", comprise connection valves on the low pressure side and on the high pressure side. The air conditioning systems are pressure tested, evacuated, and filled using these connection valves. Furthermore, these valves allow necessary maintenance operations in the further life cycle of the air conditioning system. The geometrical contours of the connection valves are of different designs. This prevents confusion between the high pressure side with the low pressure side and at the same time ensures that only the respective approved refrigerant is filled into the air conditioning system. Prevention of mix-ups with respect to filling with the wrong refrigerant is particularly required on the side of the high-pressure adapter, since it is used to fill most air conditioning systems.

Various devices for filling containers, circuits, and similar components of vehicles with fuel, lubricants, refrigerants, and other operating fluids are known from prior art, for example from U.S. Pat. No. 6,848,670 B2, U.S. 2007 / 0 256 742 A1, or WO 2007/106 486 A1. In particular, the connection geometries of the filling system and the assembly to be filled must be matched to one another.

Figure 1:
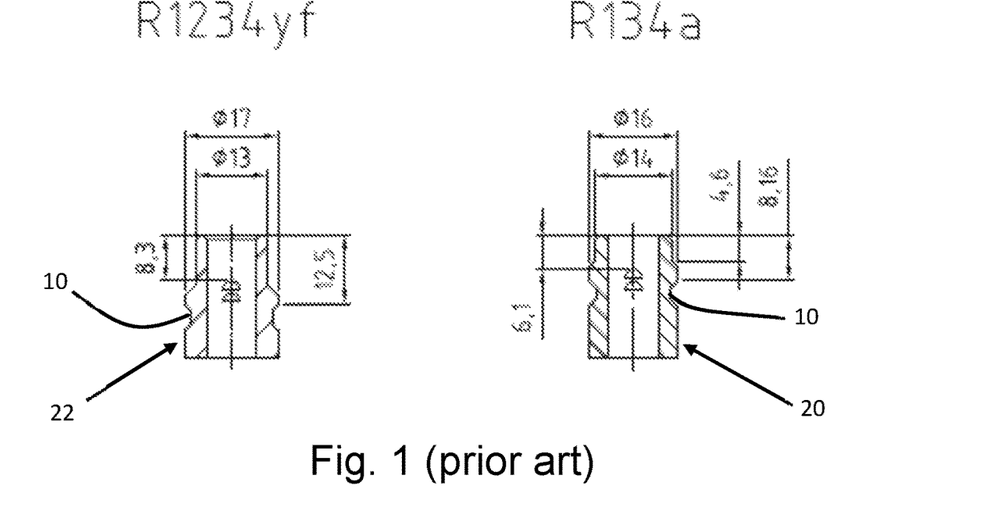
FIG. 1 shows connection valves for the refrigerants R1234yf and R134a according to prior art.

The geometries of the various connection valves on air conditioning systems are defined in the internationally binding SAE standard J 639. The exact dimensions and differences of the connection valves for the media R134a and R1234yf that are typically used as refrigerants can be seen in FIG. 1.

Figure 2:
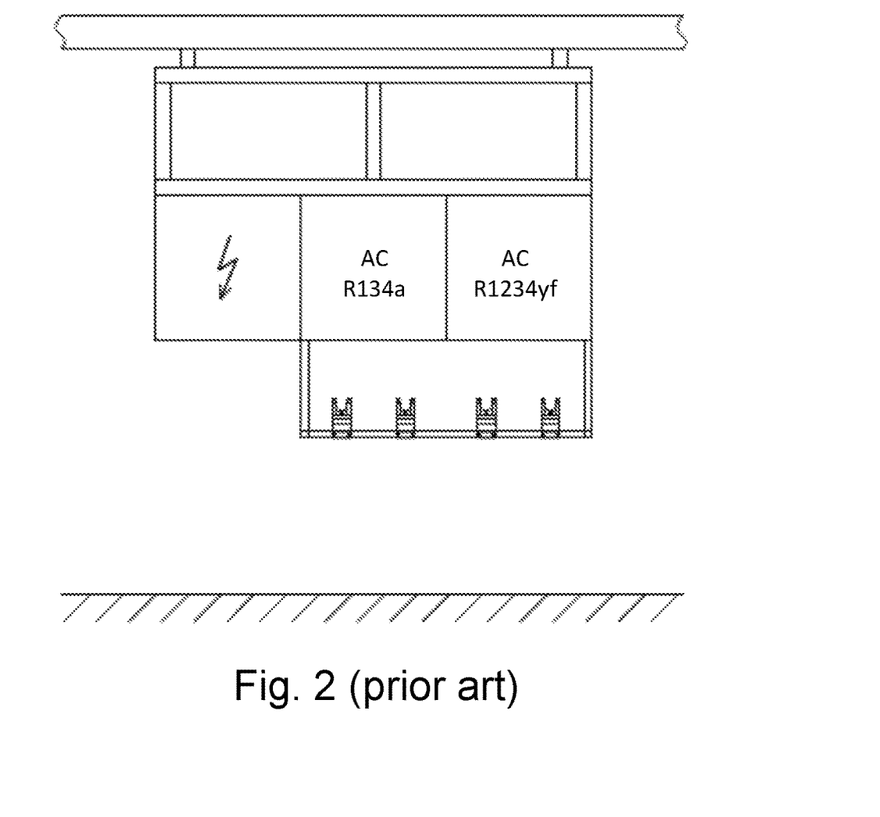
FIG. 2 shows the general structure of a filling system with media separation according to prior art.

The air conditioning systems are filled with refrigerant for the first time during final vehicle assembly. This process of initial filling is performed using filling systems that need a high pressure and a low-pressure adapter for each type of air conditioning system to be filled. Where two different air conditioning systems are installed in final vehicle assembly, which also must be filled with different refrigerants (e.g. R134a and R1234yf), a total of four adapters are required at the associated filling system. Note that the filling system uses different components for the different refrigerants. Such designs in which the filling system is divided according to the media used increase the investment required, incur costs for later maintenance and require considerable installation space at the final assembly location, which limits the space available for potential extensions of the filling system. FIG. 2 shows the general structure of a filling system of such a design with media separation according to prior art.

SUMMARY

Figure 3:
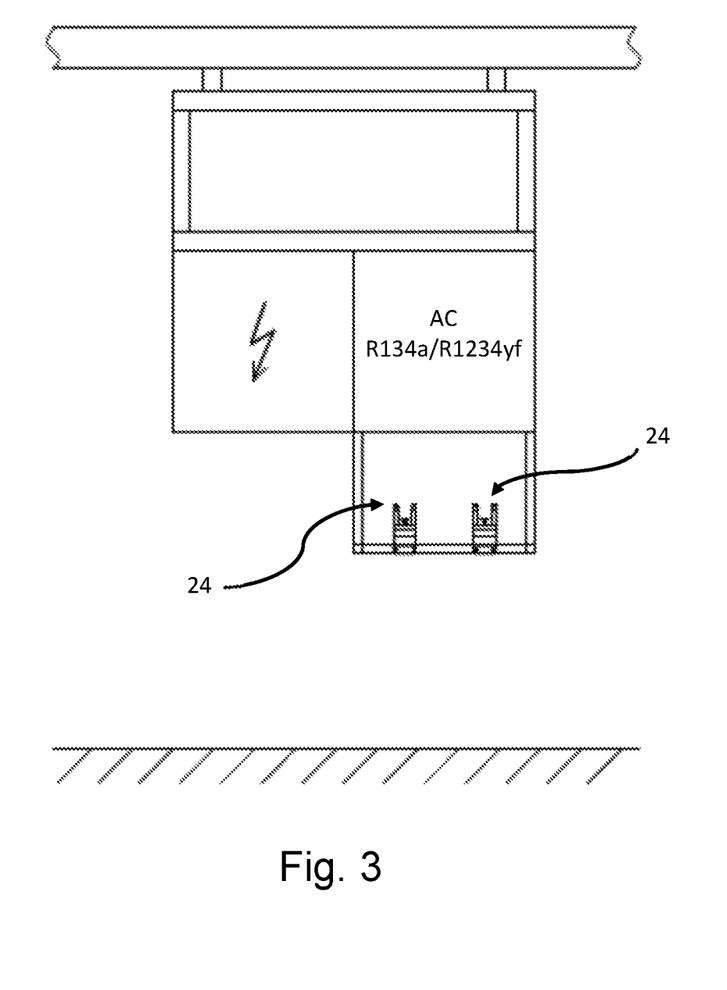
FIG. 3 shows the general structure of a novel filling system with combined filling.

It would be beneficial for avoiding such disadvantages to reduce said installation space, investment and operating costs without compromising any required mix-up prevention features with respect to different refrigerants. Thus, the structure of a conventional filling system according to FIG. 2 could be advantageously reduced to a basic structure as shown in FIG. 3.

It is therefore the object of the invention to provide a device that allows filling two different refrigerants with just two adapters (one adapter for the low-pressure side and one adapter for the high-pressure side) and still ensures that a proper refrigerant is filled into the respective air conditioning system. This requires that the high-pressure adapter and the low-pressure adapter can be mounted and tightly fitted onto different vehicle connection valves. At the same time, the system must detect the air conditioning system that is currently connected to be able to select the proper refrigerant for filling. For this purpose, it must identify the connection valves onto which the high-pressure adapter is currently mounted, which means that the differences between the connection valve geometries must be detected.

This problem is solved by a device having the technical features of claim 1. Accordingly, just one high-pressure adapter and low-pressure adapter are provided for two different refrigerants, namely R134a and R1234yf. The high-pressure adapter via which the air conditioning system is filled includes mechanical components which interact to prevent an unexpected vehicle valve from being opened for filling. The high-pressure adapter can detect a correct and/or incorrect vehicle port using an associated path measuring system.

The invention provides a device for filling air conditioning systems with a refrigerant during final vehicle assembly, wherein the air conditioning system to be filled comprises a connection valve both on its low pressure and on its high pressure sides, via which the air conditioning system can be pressure tested, evacuated, and filled and which facilitates maintenance operations in the further life cycle of the air conditioning system, wherein said connection valves have a different geometrical contour to prevent confusion between the high pressure side and the low pressure side and to ensure at the same time that only the respective approved refrigerant is filled into the air conditioning system, and wherein the filling is performed using a filling system which is brought via adapters into an operative connection with the connection valves on the low pressure and the high pressure sides.

The device comprises a clamping system that includes a slider with a magnet, a stop piston with an integrated plunger, a path measuring system, and clamping balls. The slider takes different positions based on the respective geometrical design of the connection valves, which are detected by the magnet via the path measuring system. The slider is designed so that, in its normal position, it closes the adapter with a gasket designed as an O-ring. In accordance with a preselected type on the filling system, the stop piston can be placed in positions for the one refrigerant R134a (lower position) and/or the other refrigerant R1234yf (upper position), wherein these two positions cause movement of the slider in these predetermined end positions only. The plunger that is integrated in the stop piston can perform a defined stroke to open the connection valves of the vehicle port, wherein the respective stroke movement is performed depending on the respective position of the stop piston starting from the preset position for the one or the other refrigerant. The clamping balls are held by a pin due to the required unobstructed clamping path. The high-pressure adapter comprises a separate filling line with a filling valve for each refrigerant, and the low-pressure adapter is designed to be mounted on both media-specific connection valves of the vehicle air conditioning system.

Thus a device is available that allows filling with two different refrigerants using just two adapters and still ensures that a proper refrigerant is filled into the respective air conditioning system. Accordingly, just one set of the assemblies and components required for the filling of both refrigerants is needed for similar process steps such as pressure testing and evacuating. This means that only one container per console part of a filling system is required for filling two refrigerants.

BRIEF DESCRIPTION OF DRAWINGS

An exemplary embodiment is described below with reference to the drawing. Wherein.

DETAILED DESCRIPTION

The device shown in the drawing is designed for filling air conditioning systems (so-called MACs) with a refrigerant during final vehicle assembly. The air conditioning system to be filled comprises one connection valve 20, 22 each on its low-pressure side and on its high-pressure side via which the air conditioning system can be pressure tested, evacuated, and filled and which allows the performance of maintenance operations in the further life cycle of the air conditioning system. The geometrical contours of the connection valves are of different designs to prevent mix-ups between the high-pressure side and the low-pressure side and at the same time to ensure that only the respective approved refrigerant is filled into the air conditioning system. The filling process is performed using a filling system, which is brought into an operative connection with the connection valves 20, 22 on the low-pressure side and on the high-pressure side via adapters 24.

The main aspect of the device per the invention is that only one high-pressure adapter and one low-pressure adapter are provided for two different refrigerants R134a and R1234yf. The high-pressure adapter via which the air conditioning system is filled includes mechanical components which interact to prevent an unexpected vehicle valve from being opened for filling. Furthermore, the high-pressure adapter can detect a correct or incorrect vehicle port using an associated path measuring system 6.

Figure 4:
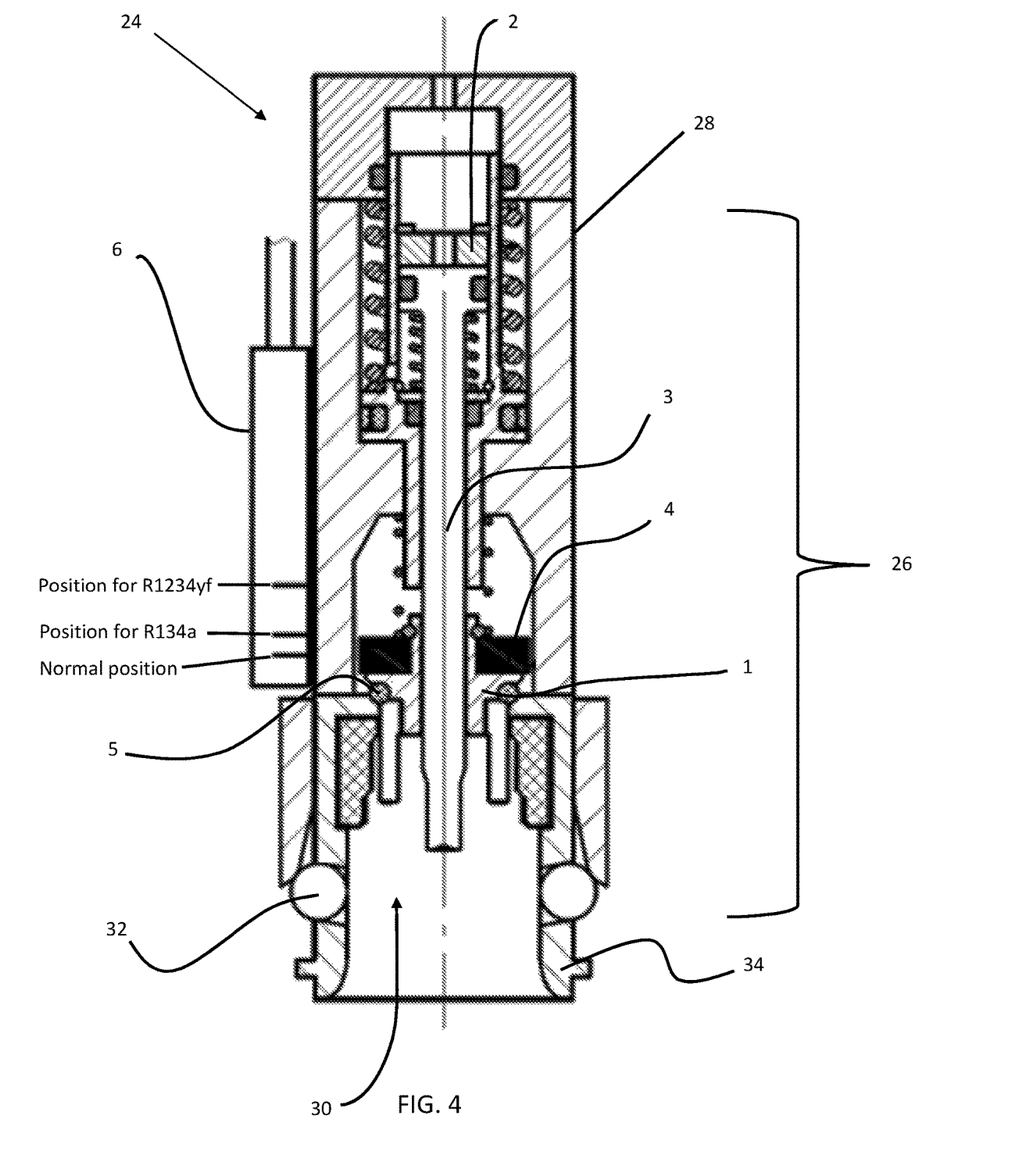
FIG. 4 shows the clamping system of the device in normal position according to the invention.

FIG. 4 shows the general structure of the adapter 24 having a clamping system 26 designed according to the invention and supported by a body 28 of the adapter 24. The clamping system 26 includes a slider 1, a stop piston 2, and a path measuring system 6 as its major components. A magnet 4 is assigned to the slider 1. The stop piston 2 comprises an integrated plunger 3.

The slider 1 takes different positions depending on the dimensions (measure L1 from SAE J639), which can be detected by the integrated magnet 4 via the path measuring system 6.

Figure 5:
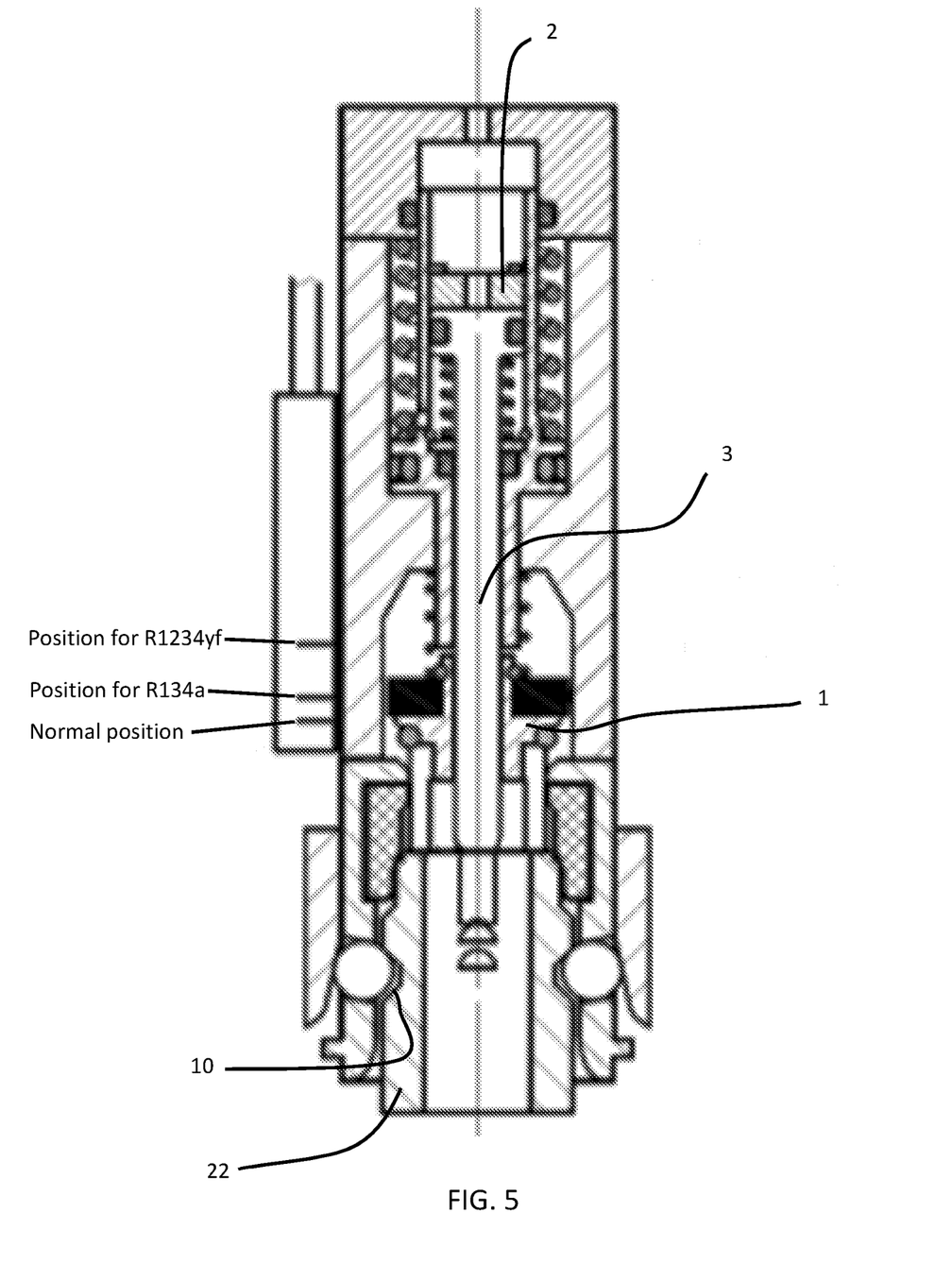
FIGS. 5 to 9 show various operating positions of a clamping system according to FIG. 4.
Figure 6:
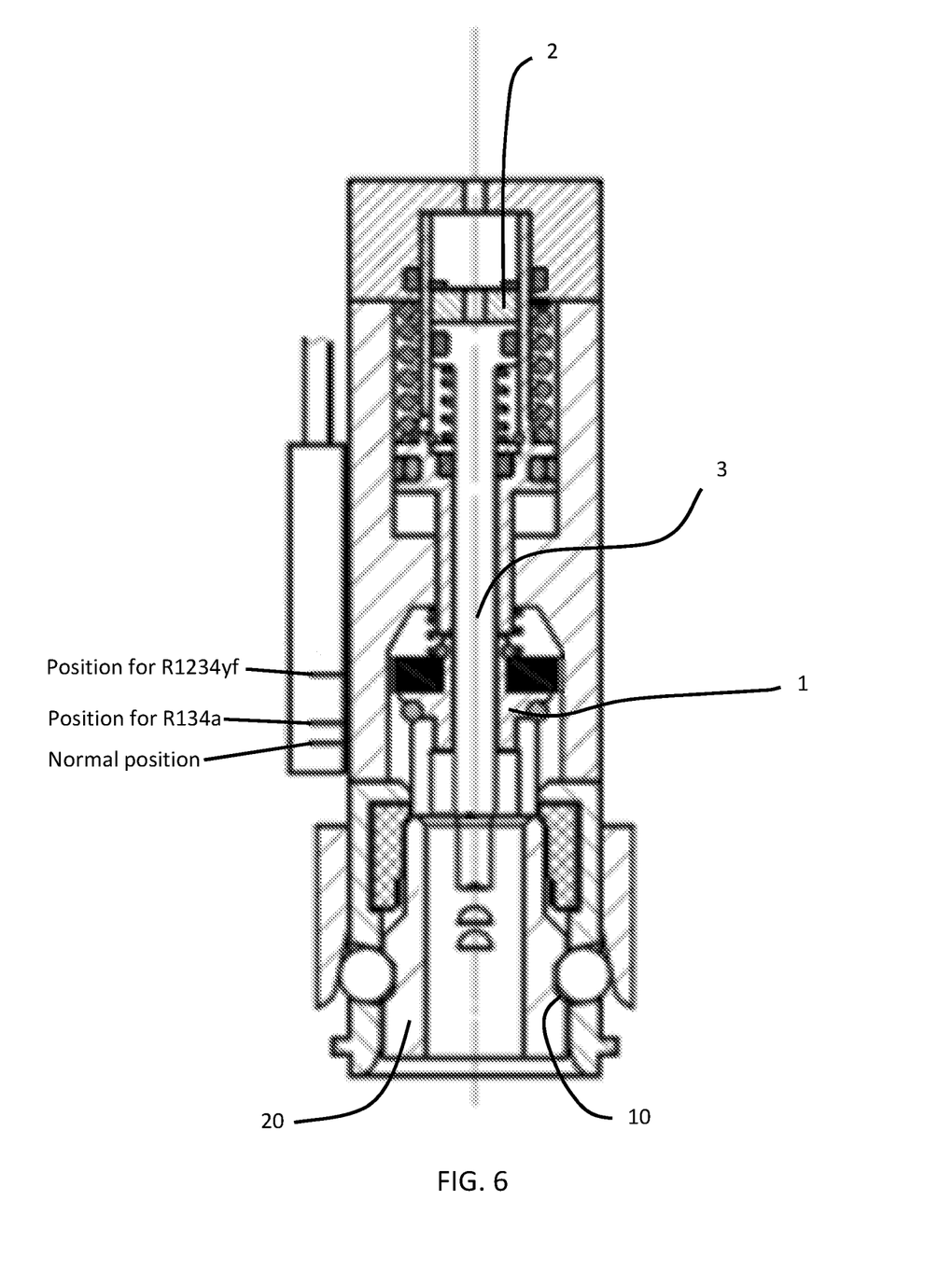

The stop piston 2 is set in accordance with the preselected type on the filling system to either the positions R134a (lower position, e.g., FIG. 5) or R1234yf (upper position, e.g., FIG. 6). These two positions allow movement of the slider 1 in these predetermined end positions only. The plunger 3 integrated in the stop piston 2 has a limited stroke for opening the connection valve 20, 22 in the vehicle port. Depending on the position of the stop piston 2, this defined stroke starts either from the preset position for R134a or R1234yf.

The slider 1 is further designed so that it closes a fluid path 30 in the adapter 24 in its normal position; for this purpose, an O-ring gasket 5 is provided on the slider 1.

The following operations are performed in a complete filling cycle:

The type of vehicle to be filled is selected manually by the worker or automatically at the filling system. Then the stop piston 2 travels to the respective position for the refrigerant R134a or the refrigerant R1234yf.

The worker places the adapter over the vehicle port, in which process the slider 1 is moved in accordance with the dimensions of the vehicle port, and tries to tighten the adapter 24.

There are four scenarios to be mentioned, which will be explained in greater detail below with reference to FIGS. 5 to 9.

FIG. 5: The system expects a vehicle port for the refrigerant R134a and finds this port.

As a result of the vehicle type selection, the stop piston 2 is in position R134a (bottom). The vehicle port for R134a is present. The slider 1 with the magnet 4 is shifted to the R134a position. The path measuring system 6 confirms the position. The adapter 24 can successfully be tightened. The slider 1 opens the fluid path 30. The plunger 3 can open the vehicle connection valve 22. Filling is therefore possible.

FIG. 6: The system expects a vehicle port for the refrigerant R1234yf and finds this port.

As a result of the vehicle type selection, the stop piston 2 is in position R1234yf (top). The vehicle port for R1234yf is present. The slider 1 with the magnet 4 is shifted to the R1234yf position. The path measuring system 6 confirms the position. The adapter 24 can successfully be tightened. The slider 1 opens the fluid path 30. The plunger 3 can open the vehicle connection valve 20. Filling is therefore possible.

Figure 7:
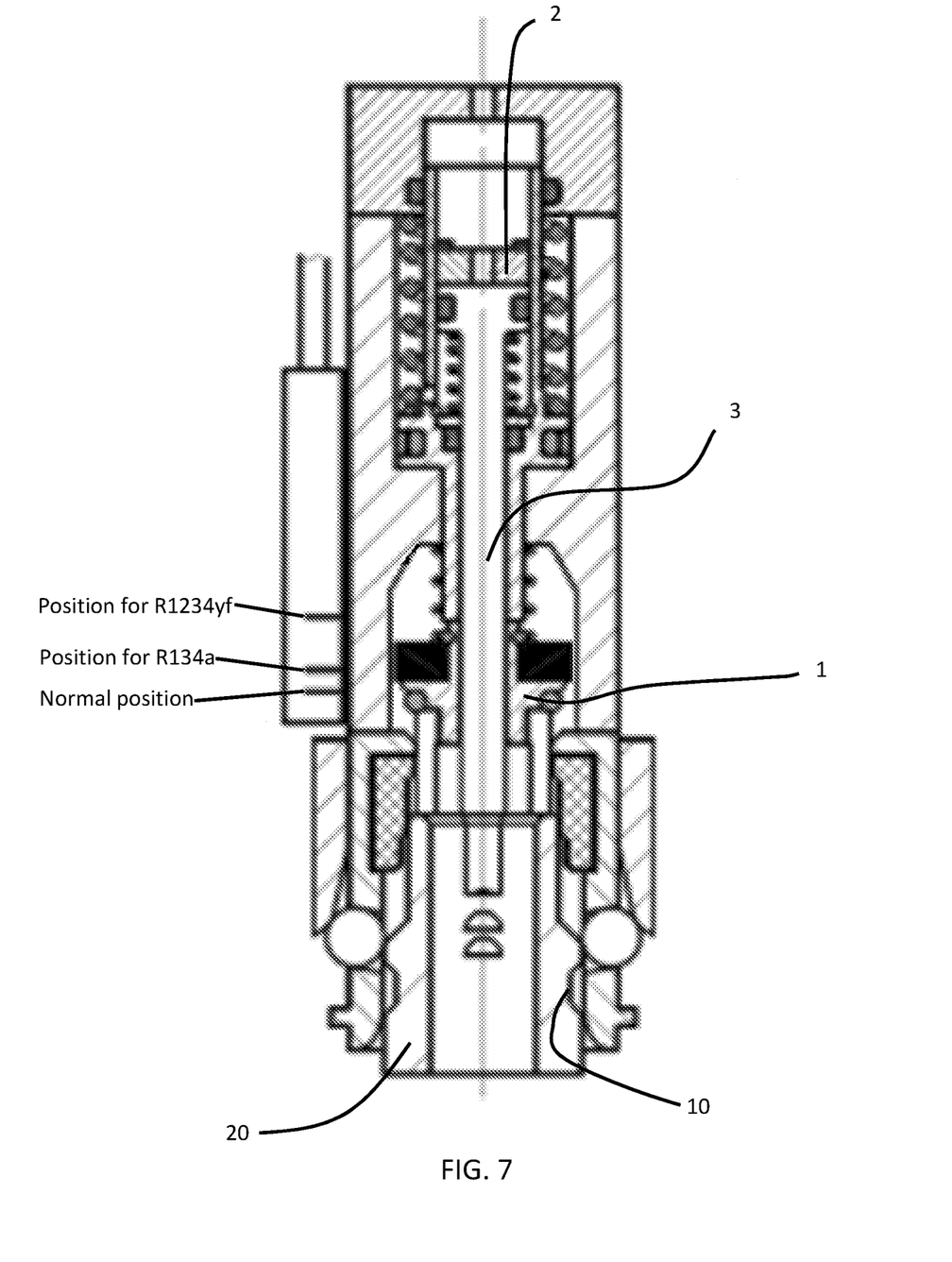
Figure 8:
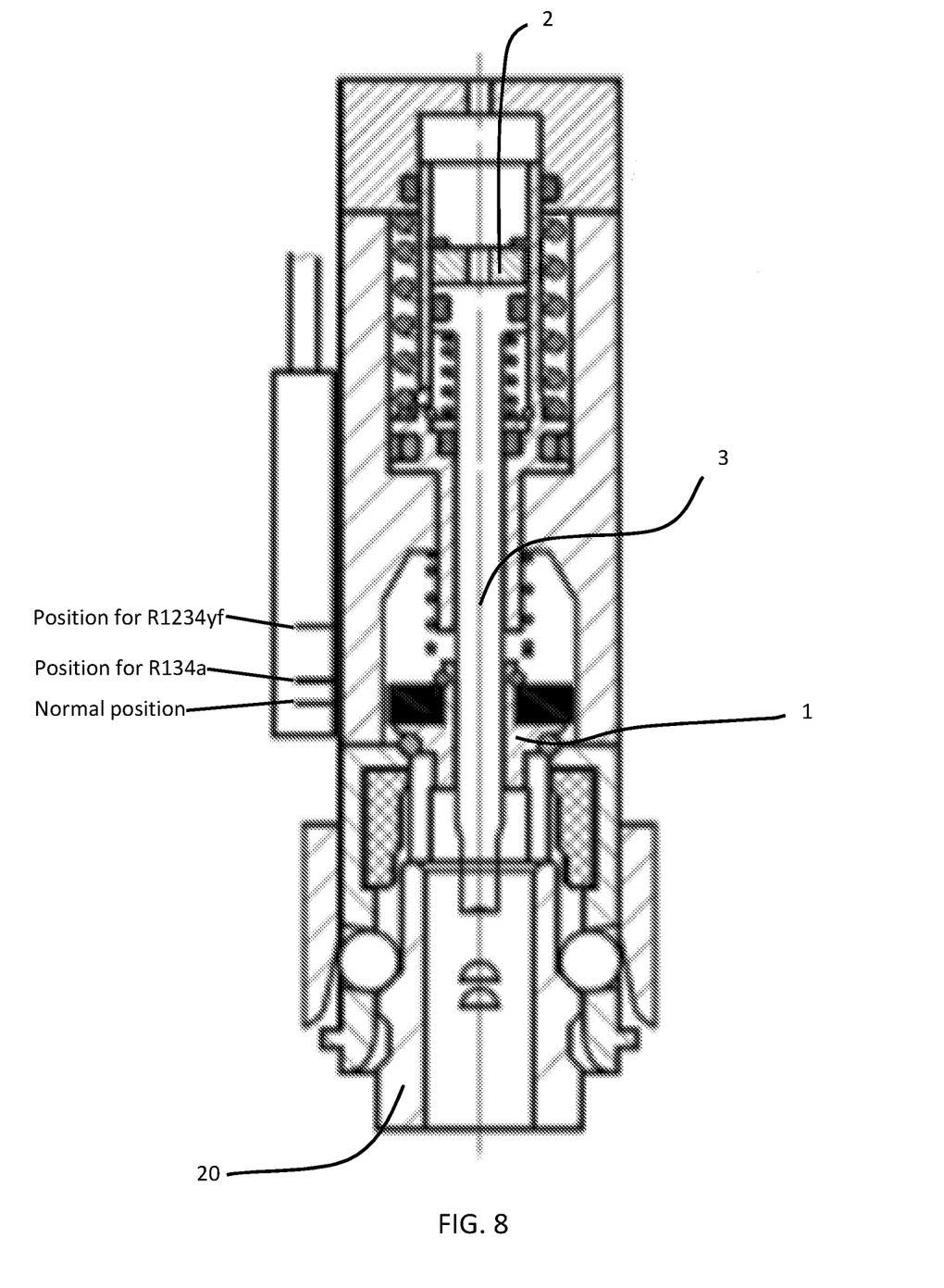

FIGS. 7 and 8: The system expects a vehicle port for the R134a refrigerant but is given a vehicle port for the R1234yf refrigerant instead.

As a result of the vehicle type selection, the stop piston 2 is in position R134a (bottom). The vehicle port for R1234yf is present. The slider 1 with the magnet 1 is limited to the position for R134a by the stop piston 2. The adapter 24 cannot be tightened successfully. There is no positive locking connection, and the vehicle port is pressed out during clamping. The path measuring system 6 detects the incorrect position. The slider 1 goes to its normal position and closes the fluid path 30.

The plunger 3 cannot open the vehicle connection valve 20 because clamping was not successful. Filling is therefore not possible.

Figure 9:
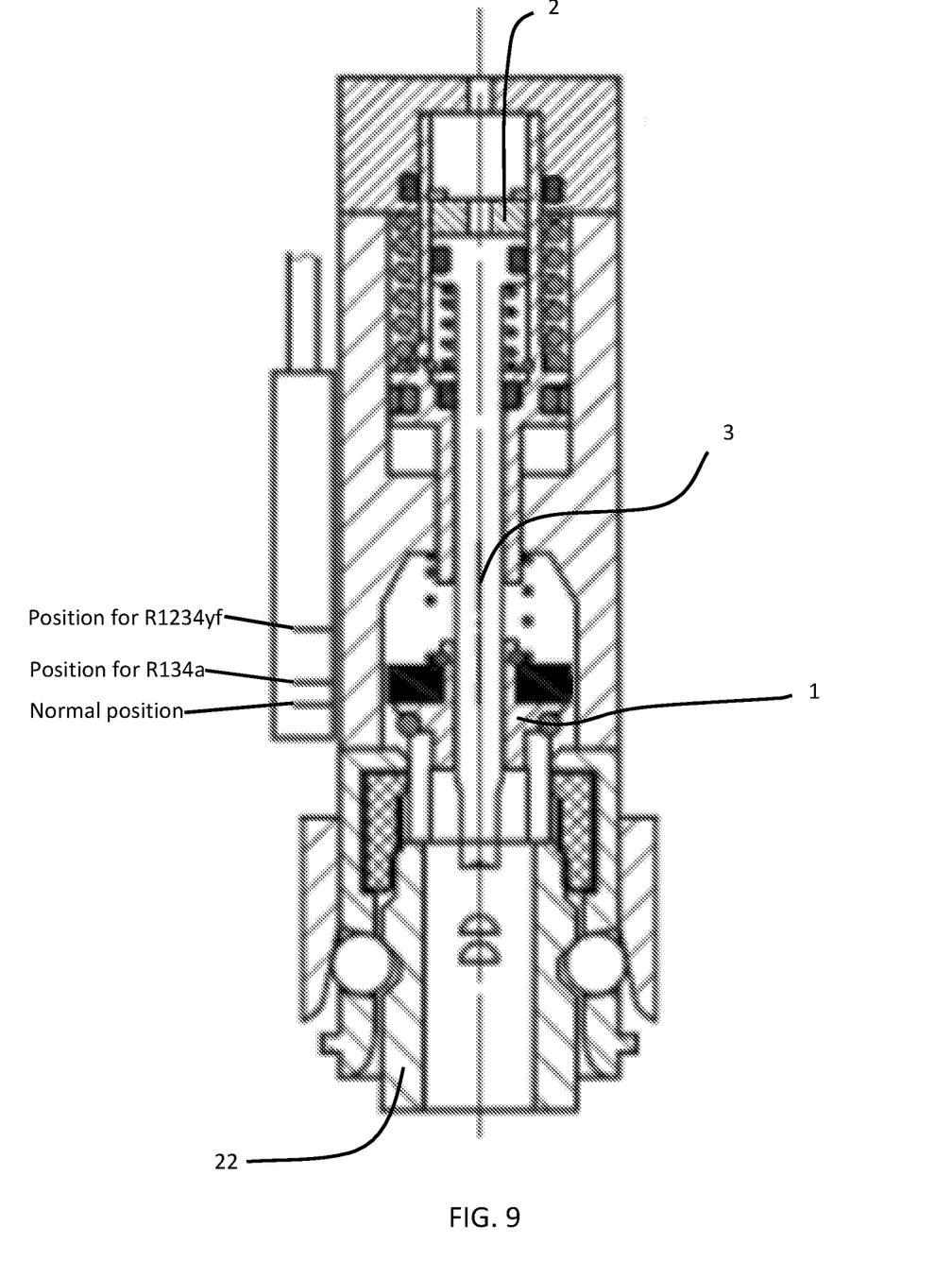

FIG. 9: The system expects a vehicle port for the R1234yf refrigerant but is given a vehicle port for the R134a refrigerant instead.

As a result of the vehicle type selection, the stop piston 2 is in position R1234yf (top). The vehicle port for R134a is present. The slider 1 with the magnet 4 is limited to the position for R1234yf by the stop piston 2 and is only shifted to the position for R134a. The adapter can be tightened successfully, there is a positive locking connection. The path measuring system 6 detects the incorrect position. The slider 1 opens the fluid path 30. The plunger 3 cannot open the vehicle connection valve 22 because the stroke of the plunger 3 is not sufficient to open the connection valve 22 in the vehicle. Filling is therefore not possible.

Figure 10:
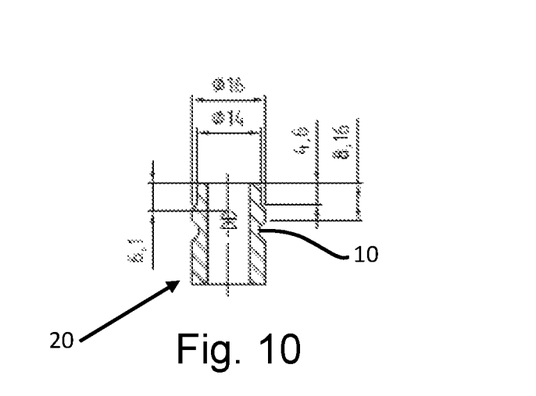
FIG. 10 shows a detail of the clamping system for fixing the position of clamping balls.

It should further be considered that the adapter 24 must be clamped in a positive locking, vacuum and pressure tight manner. This is achieved through clamping balls 32 being engaged in a circumferential groove 10 of the vehicle port that can be seen in FIG. 10.

Figure 11:
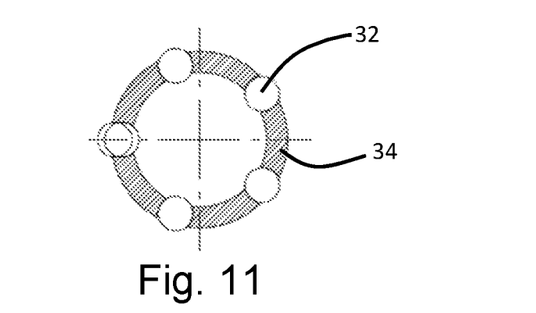
FIG. 11 shows a detail of the clamping system with a carrier for clamping balls.

In a clamping system 26 that is fitted to a refrigerant port, these clamping balls 32 can be held in a carrier 34 due to the positive locking connection and will not fall out during clamping/unclamping, see FIG. 11.

Figure 12:
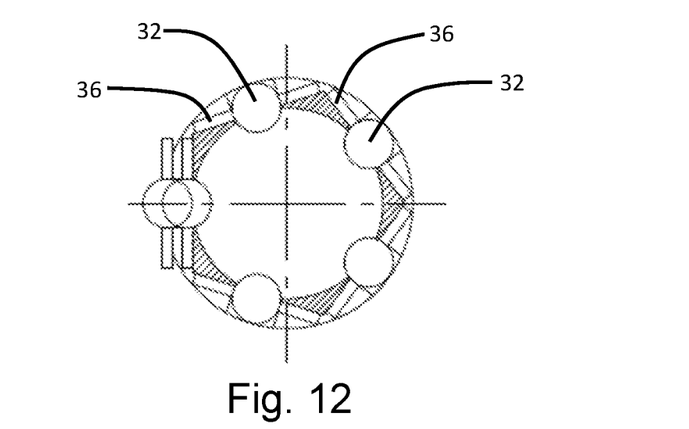
FIG. 12 shows a detail of the clamping system with an additional locking system for clamping balls.

If the clamping system 26 is to be extended to different vehicle ports, the clamping balls 32 must be held by a different design to provide the required greater freedom of actuating travel. A suitable variant is shown in FIG. 12. The clamping balls 32 are equipped with pins 36 that hold them in the extended range of travel.

The present technical solution provides a clamping system that uses mechanical stops and locks and a high degree of prevention of mixing-up filling refrigerants and prevention of filling refrigerant into the wrong vehicle port despite having significantly fewer components compared to prior art. At the same time, a path measuring system indicates the vehicle port (R134a or R1234yf) onto which the adapter has been placed.

The invention claimed is:

1. A device for filling air conditioning systems of vehicles with a refrigerant during a final vehicle assembly,
   wherein each air conditioning system to be filled comprises a high-pressure connection valve on a high pressure side of the air conditioning system and a low-pressure connection valve on a low pressure side of the air conditioning system, wherein the high-pressure and low-pressure connection valves differ in their geometrical contour to prevent mix-ups between the high-pressure side and the low-pressure side and at the same time to ensure that only a preselected refrigerant approved for use in the air conditioning system is filled into the air conditioning system, and
   wherein the device can be brought into an operative connection with the low-pressure connection valve on the low-pressure side using a low-pressure adapter and the high-pressure connection valve on the high-pressure side using a high pressure adapter;
   wherein just one of the high pressure adapter and one of the low pressure adapter is provided for two different refrigerants R134a and R1234yf,
   wherein the high-pressure and low-pressure connection valves of each air conditioning system to be filled have different design geometries depending upon which of the two different refrigerants R134a and R1234yf is approved for use in the air conditioning system,
   wherein the high-pressure adapter via which the air conditioning system is filled includes mechanical components which interact to prevent a connection valve that does not match a preselected refrigerant of the two different refrigerants approved for use in the air conditioning system from being opened for filling,
   wherein, by preselecting one of the two different refrigerants R134a and R1234yf for filling the air conditioning system, the high-pressure adapter can detect a correct and/or incorrect connection valve, wherein
   the high-pressure adapter comprises a clamping system that includes a slider with a magnet, a stop piston with an integrated plunger, a path measuring system and clamping balls,
   wherein the slider takes different positions based on the respective design geometries of the connection valves, which are detected by the magnet via the path measuring system,
   wherein the slider is designed so that, in its normal position, it closes a flow path through the adapter with a gasket designed as an O-ring,
   wherein the stop piston can be placed in a preset position comprising a lower position for the refrigerant R134a and an upper position for the refrigerant R1234yf,
   wherein the lower and upper positions respectively allow movement of the slider in these lower and upper positions only,
   wherein the plunger integrated in the stop piston can perform a limited stroke to open the connection valves,
   wherein the respective stroke movement is performed depending on the respective position of the stop piston, starting from the preset position for the refrigerant, R134a, or the refrigerant, R1234yf, and
   wherein the clamping balls are held in a carrier by pins.

2. The device according to claim 1, wherein the high-pressure adapter has a separate filling line with a filling valve for each refrigerant.

3. The device according to claim 1, wherein the low-pressure adapter is designed to be mounted on the low-pressure connection valve of each air conditioning system notwithstanding which of the two different refrigerants R134a and R1234yf is approved for use in the air conditioning system.

4. An adapter for connecting a refrigerant filling system to a mobile air conditioning system, wherein the refrigerant filling system is configured to dispense a first refrigerant to a first mobile air conditioning system having a first connection valve having a first geometry and a second refrigerant to a second mobile air conditioning system having a second connection valve with a second geometry, the adapter comprising:
   a body comprising a fluid path therethrough;
   a clamping system supported by the body and configured for connecting the adapter to the first connection valve and the second connection valve;
   wherein the clamping system comprises a first preset configuration and a second preset configuration;
   wherein the first preset configuration is associated with connecting the adapter to the first connection valve when the refrigerant filling system is configured to dispense the first refrigerant to the first mobile air conditioning system;
   wherein the second preset configuration is associated with connecting the adapter to the second connection valve when the refrigerant filling system is configured to dispense the second refrigerant to the second mobile air condition system;

wherein the clamping system is operable to detect whether the refrigerant filling system is connecting to a correct one of the first mobile air conditioning system and the second mobile air conditioning system;

wherein the clamping system further comprises:
- a slider movable to open and close the fluid path;
- a magnet associated with the slider;
- wherein the slider and the magnet are movable together between a normal position, a first position, and a second position;
- wherein the slider closes the fluid path in the normal position and opens the fluid path in the first position and in the second position;
- a stop piston wherein when the clamping system is in the first preset configuration the stop piston is positioned in a lower preset position and the stop piston prevents movement of the slider and the magnet to the second position, and when the clamping system is in the second preset configuration the stop piston is positioned in an upper preset position and the stop piston does not prevent movement of the slider and the magnet to the second position;
- wherein the stop piston comprises a plunger having a limited stroke that is configured to engage the first connection valve and the second connection valve;
- a path measuring system for detecting the position of the magnet in a correct position or an incorrect position; and
- clamping balls retained in a carrier, wherein the clamping balls are configured for engaging the first geometry and locking the adapter to the first connection valve and engaging the second geometry and locking the adapter to the second connection valve;

wherein when the clamping system is in the first preset configuration and the adapter encounters the first connection valve, the adapter enables the refrigerant filling system to dispense the first refrigerant to the first mobile air conditioning system wherein the slider and the magnet move from the normal position to the first position, the fluid path is open, the path measuring system detects the position of the magnet in the correct position, the clamping balls lock the adapter to the first connection valve, and the plunger engages and opens the first connection valve;

wherein when the clamping system is in the second preset configuration and the adapter encounters the second connection valve, the adapter enables the refrigerant filling system to dispense the second refrigerant to the second mobile air conditioning system wherein the slider and the magnet move from the normal position to the second position, the fluid path is open, the path measuring system detects the position of the position of the magnet the correct position, the clamping balls lock the adapter to the second connection valve, and the plunger engages and opens the second connection valve;

wherein when the clamping system is in the first preset configuration and the adapter encounters the second connection valve, the adapter prevents the refrigerant filling system from dispensing the first refrigerant to the second mobile air conditioning system wherein the stop piston limits the movement of the slider and the magnet from the normal position to the first position and the clamping balls are prevented from locking the adapter to the second connection valve; and wherein when the clamping system is in the second present configuration and the adapter engages the first connection valve, the adapter prevents the refrigerant filling system from dispensing the second refrigerant to the first mobile air conditioning system wherein the slider and the magnet move from the normal position to the first position, the fluid path is open, the path measuring system detects the position of the magnet in the incorrect position, the clamping balls lock the adapter to the second connection valve, and the plunger is inoperable to engage and open the first connection valve.

5. A refrigerant filling system for filling mobile air conditioning systems with a first refrigerant and a second refrigerant comprising the adapter of claim 4.

* * * * *

UNITED STATES PATENT AND TRADEMARK OFFICE
CERTIFICATE OF CORRECTION

PATENT NO. : 10,328,767 B2
APPLICATION NO. : 15/329472
DATED : June 25, 2019
INVENTOR(S) : Carsten Wohner, Frank Wieland and Daniel Wappler Page 1 of 1

It is certified that error appears in the above-identified patent and that said Letters Patent is hereby corrected as shown below:

In the Claims

In Claim 4, Column 8, Line 13, after "detects the", delete "position of the".

In Claim 4, Column 8, Line 14, after "magnet", insert -- in --.

Signed and Sealed this
Twentieth Day of August, 2019

Andrei Iancu
*Director of the United States Patent and Trademark Office*